(12) United States Patent
Scheiber et al.

(10) Patent No.: US 7,920,044 B2
(45) Date of Patent: Apr. 5, 2011

(54) APPLIANCE ASSEMBLY WITH THERMAL FUSE AND TEMPERATURE SENSING DEVICE ASSEMBLY

(75) Inventors: Joseph J. Scheiber, Kimmell, IN (US); Michael S. Coverstone, Pierceton, IN (US)

(73) Assignee: Group Dekko, Inc., Kendallville, IN (US)

( * ) Notice: Subject to any disclaimer, the term of this patent is extended or adjusted under 35 U.S.C. 154(b) by 185 days.

(21) Appl. No.: 12/121,823

(22) Filed: May 16, 2008

(65) Prior Publication Data

US 2008/0284558 A1    Nov. 20, 2008

Related U.S. Application Data

(60) Provisional application No. 60/938,319, filed on May 16, 2007.

(51) Int. Cl.
*H01H 37/76* (2006.01)

(52) U.S. Cl. ............... 337/186; 337/4; 337/35; 337/187; 337/401; 337/414

(58) Field of Classification Search .................. 337/4, 6, 337/20, 35, 401, 186, 187, 414
See application file for complete search history.

(56) References Cited

U.S. PATENT DOCUMENTS

| 2,885,789 | A |   | 5/1959  | Conkling et al. |           |
|-----------|---|---|---------|-----------------|-----------|
| 3,227,841 | A |   | 1/1966  | Gaia            |           |
| 3,622,931 | A |   | 11/1971 | Walterick       |           |
| 3,701,068 | A | * | 10/1972 | Johnsen         | 337/102   |
| 3,715,697 | A | * | 2/1973  | Them            | 337/157   |
| 3,786,388 | A | * | 1/1974  | Sato            | 337/269   |
| 3,828,289 | A | * | 8/1974  | Hickling        | 337/5     |
| 3,852,697 | A | * | 12/1974 | Snider          | 337/348   |
| 3,931,602 | A | * | 1/1976  | Plasko          | 337/163   |
| 4,001,751 | A | * | 1/1977  | Deubel          | 337/343   |
| 4,096,464 | A |   | 6/1978  | Dennis et al.   |           |
| 4,267,543 | A |   | 5/1981  | Arikawa         |           |
| 4,297,668 | A |   | 10/1981 | Place           |           |
| 4,313,047 | A | * | 1/1982  | Cox et al.      | 219/253   |
| 4,472,705 | A | * | 9/1984  | Carlson         | 337/299   |
| 4,653,708 | A | * | 3/1987  | Rich            | 248/27.1  |
| 4,720,759 | A | * | 1/1988  | Tabei           | 361/105   |
| 4,887,063 | A |   | 12/1989 | Hofsass         |           |
| 5,014,036 | A |   | 5/1991  | Komoto          |           |
| 5,347,610 | A |   | 9/1994  | Lee             |           |
| 5,564,831 | A |   | 10/1996 | Bashark         |           |
| 5,621,370 | A |   | 4/1997  | St. Louis       |           |
| 5,831,507 | A |   | 11/1998 | Kasamatsu et al.|           |
| 5,963,122 | A | * | 10/1999 | Endo et al.     | 337/198   |
| 6,011,458 | A | * | 1/2000  | Endo et al.     | 337/198   |
| 6,127,913 | A | * | 10/2000 | Niino et al.    | 337/343   |

(Continued)

FOREIGN PATENT DOCUMENTS

WO    WO2005024115    3/2005

*Primary Examiner* — Anatoly Vortman
(74) *Attorney, Agent, or Firm* — Taylor IP (57) ABSTRACT

An appliance assembly includes an appliance and a thermal assembly. The thermal assembly includes a housing attached to the appliance, a temperature sensing device carried by the housing and electrically coupled with the appliance, and a thermal fuse carried by the housing and electrically coupled with the appliance, the thermal assembly being a modular assembly and thereby configured for being, as a single unit, attached to and detached from the appliance.

17 Claims, 6 Drawing Sheets

U.S. PATENT DOCUMENTS

| | | | |
|---|---|---|---|
| 6,144,283 A * | 11/2000 | Matsumura | 337/198 |
| 6,252,488 B1 * | 6/2001 | Ziegler et al. | 337/5 |
| 6,300,859 B1 * | 10/2001 | Myong et al. | 337/182 |
| D460,742 S | 7/2002 | Iby et al. | |
| D460,949 S | 7/2002 | Iby et al. | |
| 6,430,019 B1 * | 8/2002 | Martenson et al. | 361/124 |
| 6,445,277 B1 * | 9/2002 | Ishikawa et al. | 337/297 |
| 6,492,747 B1 | 12/2002 | Hoffmann | |
| 6,507,264 B1 * | 1/2003 | Whitney | 337/159 |
| 6,566,995 B2 * | 5/2003 | Furuuchi et al. | 337/183 |
| 6,583,711 B2 | 6/2003 | Yang | |
| 6,707,370 B2 * | 3/2004 | Ritt et al. | 337/299 |
| 6,808,669 B2 | 10/2004 | Kim | |
| 6,836,205 B2 | 12/2004 | Scott et al. | |
| 7,477,503 B2 * | 1/2009 | Aszmus | 361/124 |
| 7,515,029 B2 * | 4/2009 | Sahashi et al. | 337/89 |
| 7,529,072 B2 * | 5/2009 | Nishikawa | 361/104 |
| 2004/0135663 A1 | 7/2004 | Jang | |
| 2005/0045620 A1 | 3/2005 | Chen-Lung et al. | |
| 2005/0140491 A1 | 6/2005 | Uehara et al. | |
| 2005/0269309 A1 | 12/2005 | Chung Lau et al. | |

* cited by examiner

APPLIANCE ASSEMBLY WITH THERMAL FUSE AND TEMPERATURE SENSING DEVICE ASSEMBLY

CROSS REFERENCE TO RELATED APPLICATIONS

This is a non-provisional application based upon U.S. provisional patent application Ser. No. 60/938,319, entitled "THERMAL FUSE AND TEMPERATURE CONTROL DEVICE ASSEMBLY", filed May 16, 2007, which is incorporated herein by reference.

BACKGROUND OF THE INVENTION

1. Field of the Invention

The present invention relates to appliances, and, more particularly, to a thermal assembly used in an appliance.

2. Description of the Related Art

An appliance can include a heater. A temperature sensing device can be used to regulate the amount of heat produced by the heater. A thermal fuse can also be used to shut down the heater before the heat produced by the heater reaches a dangerous level. If a thermal fuse opens, that thermal fuse needs to be replaced. A problem arises, however, when that thermal fuse opens. That is, upon replacing the thermal fuse and restarting the appliance, the new thermal fuse may blow shortly thereafter if the temperature sensing device was what originally malfunctioned and was not replaced at the same time as the thermal fuse. This can unfortunately result in multiple service calls.

What is needed in the art is a modular thermal assembly which has both a temperature sensing device and a thermal fuse such that the thermal assembly is, as a single unit, attachable and detachable relative to an appliance.

SUMMARY OF THE INVENTION

What is needed in the art is a modular thermal assembly which has both a temperature sensing device and a thermal fuse such that the thermal assembly is, as a single unit, attachable and detachable relative to an appliance.

The invention in one form is directed to an appliance assembly including an appliance and a thermal assembly. The thermal assembly includes a housing attached to the appliance, a temperature sensing device carried by the housing and electrically coupled with the appliance, and a thermal fuse carried by the housing and electrically coupled with the appliance, the thermal assembly being a modular assembly and thereby configured for being, as a single unit, attached to and detached from the appliance.

The invention in another form is directed to a thermal assembly including a housing configured for coupling with an appliance, a temperature sensing device carried by the housing and configured for electrically coupling with the appliance, and a thermal fuse carried by the housing and configured for electrically coupling with the appliance, the thermal assembly being a modular assembly and thereby configured for being, as a single unit, attached to and detached from the appliance.

The invention in yet another form is directed to a method of monitoring heat produced by a heater of an appliance. The method includes the steps of providing, attaching, electrically coupling, cutting off, and detaching. The providing step provides a thermal assembly including a housing, a temperature sensing device carried by the housing, and a thermal fuse carried by the housing. The attaching step attaches the thermal assembly, as a single unit, to the appliance. The electrically coupling step electrically couples the temperature sensing device and the thermal fuse with the appliance. The cutting off step cuts off the heat produced by the heater using the thermal assembly. The detaching step detaches the thermal assembly, as said single unit, from the appliance, the thermal assembly being a modular assembly.

An advantage of the present invention is that a temperature sensing device and a thermal fuse are mounted on a common housing to form a single unit.

Another advantage is that the thermal fuse temperature detecting accuracy is improved because the thermal fuse and the temperature sensing device are mounted in nearly the same location.

Yet another advantage is that repeat service calls are reduced.

Yet another advantage is that an appliance manufacturer saves costs by installing only one device, the thermal assembly, on the appliance.

Yet another advantage is that the part manufacturer, the appliance manufacturer, and/or the servicing agency can experience reduced costs associated with stocking and tracking multiple part numbers.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
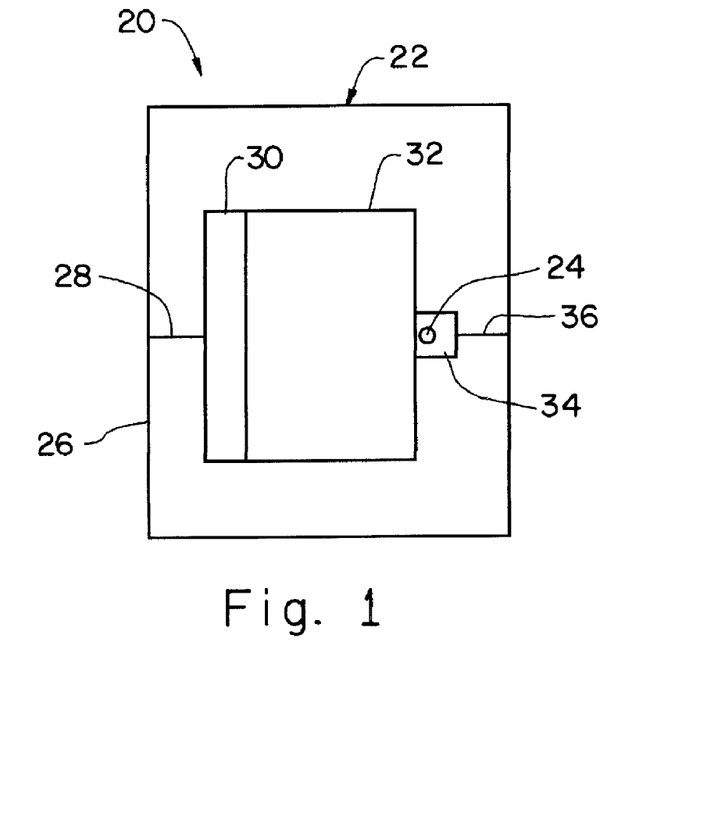
FIG. 1 is a schematic representation of an appliance assembly including an appliance and a thermal assembly.
Figure 2:
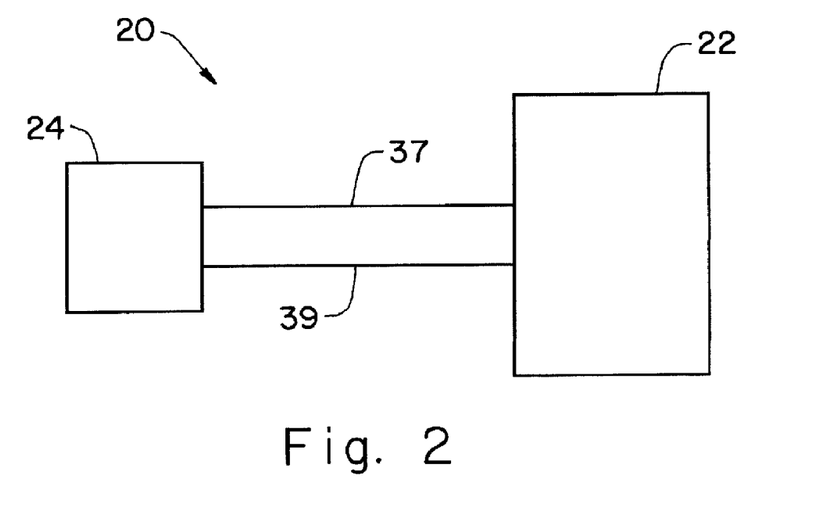
FIG. 2 is a schematic representation showing the mechanical and electrical connections between the thermal assembly and the appliance of the appliance assembly of FIG. 1.

Referring now to the drawings, and more particularly to FIGS. 1-2, there is shown an appliance assembly 20 which generally includes an appliance 22 and a thermal assembly 24. Appliance 22 can be, for example, a laundry dryer, a dishwasher, an oven, and/or any other appliance that produces heat using a heater or incidental heat. This listing of appliances is not intended to be limiting.

FIG. 1 shows that appliance 22 (a laundry dryer 22) includes an external housing 26, an air intake 28, a fan (not shown), a heater 30, a rotating drum 32, an exhaust gas outlet or housing 34 (for example, an exhaust gas outlet manifold 34 or, simply, a dryer manifold 34), a hot air exhaust line 36, and thermal assembly 24. In general, the fan can be used to draw ambient air into air intake 28. That ambient air can then be heated by heater 30 (which can be a heating coil), and thus heater 30 can be used to heat the interior of rotating drum 32 of the clothes dryer 22. The warmed air can then be supplied to rotating drum 32 which tumbles the clothes in drum 32. Drum 32 can be rotated by a motor and belt arrangement (not shown). Hot air inside drum 32 can be moved out the other end of drum 32 (opposite the air intake side of drum 32), through a lint filter (not shown), and into hot air exhaust manifold 34, which can be used to vent the hot air exhaust away from dryer 22 through a hot air exhaust line 36. It can be appreciated that the design of dryer 22 can take on various forms. The design of dryer 22 should be such that thermal assembly 24 can accurately detect the degree of heat inside or exiting drum 32. Further, appliance 22 can include a wall 38 which defines a plurality of mounting holes 86, 88, 90. Wall 38 can be flat; wall 38, however, need not be completely flat or planar but can have some curvature.

FIG. 2 shows that thermal assembly 24 has a mechanical connection 37 and an electrical connection 39 with appliance. While FIG. 2 shows thermal assembly 24 apart from appliance, it is to be understood that thermal assembly 24 is carried by, and can be disposed within, appliance 22, as indicated in FIG. 1.

As shown in FIGS. 2-6, thermal assembly 24 includes a housing 40 attached to and carried by appliance 22, a temperature sensing device 42 carried by housing 40 and electrically coupled with appliance 22, and a thermal fuse 44 carried by housing 40 and electrically coupled with appliance 22. Thermal assembly 24 is a modular assembly and thereby is, as a single unit, attached to and detached from appliance 22. Further, housing 40 can include a snap-fit arrangement 46 coupled with appliance 22.

Figure 3:
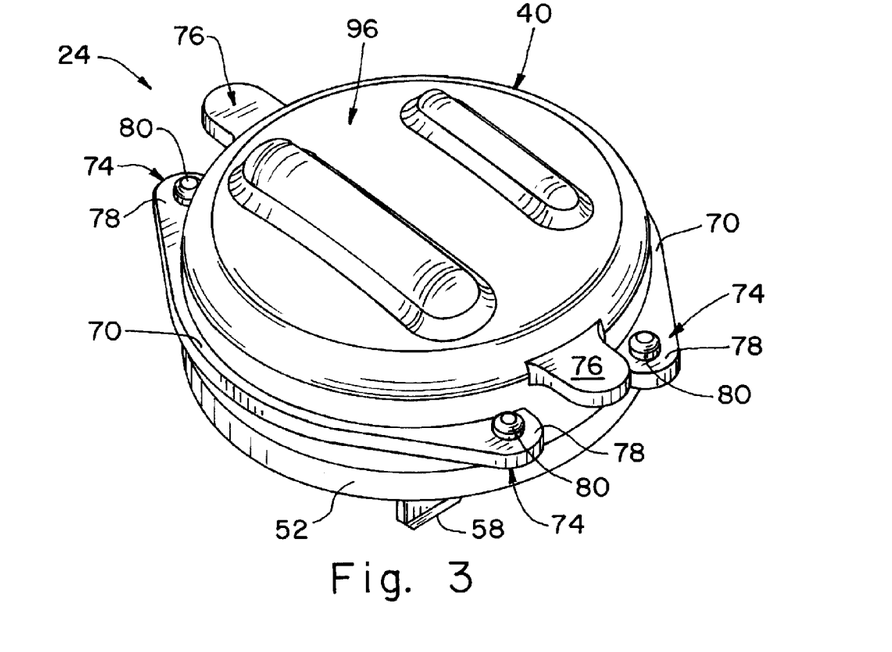
FIG. 3 is a top perspective view of the thermal assembly of FIG. 1.
Figure 6:
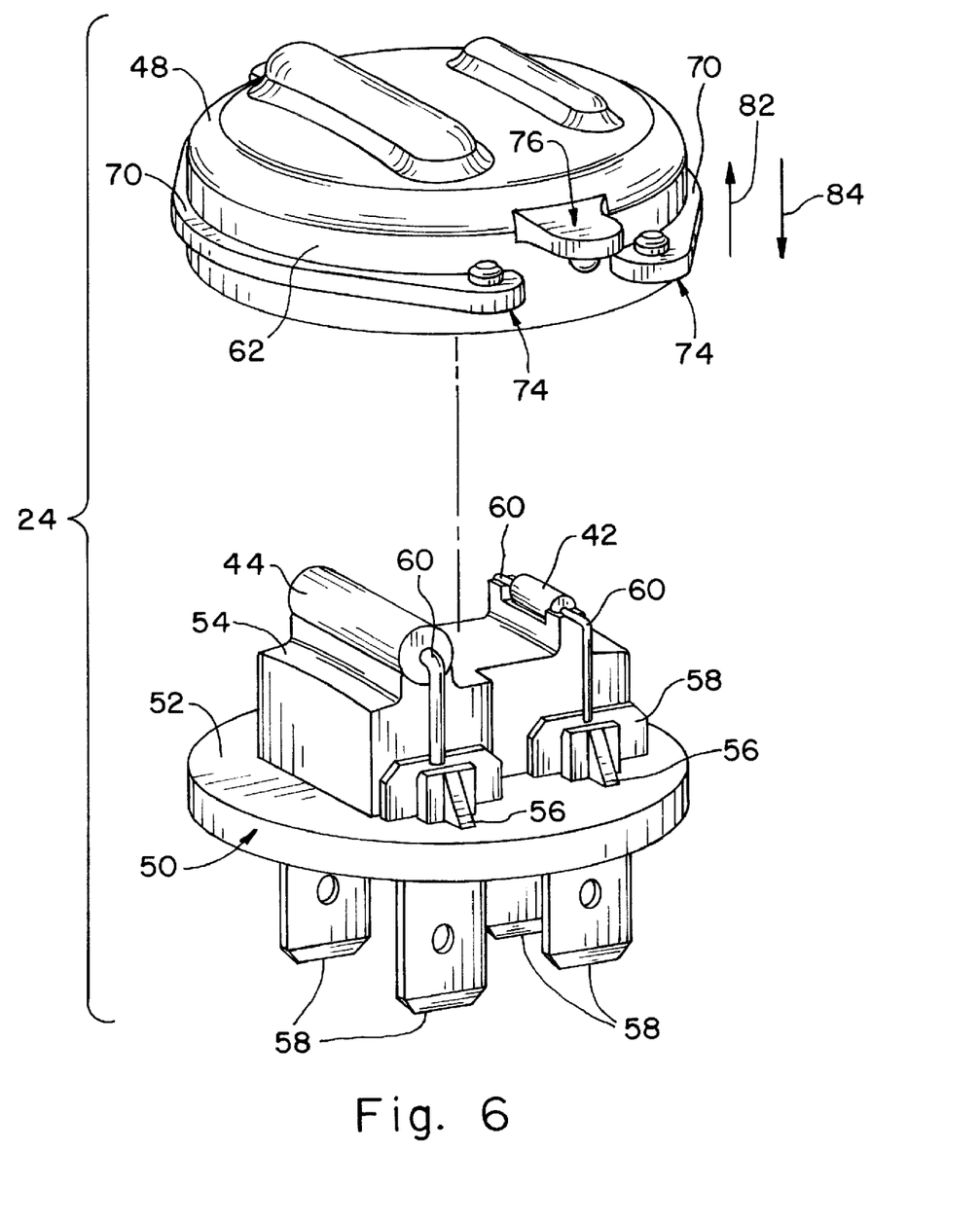
FIG. 6 is an exploded perspective view of the thermal assembly of FIG. 3.
Figure 7:
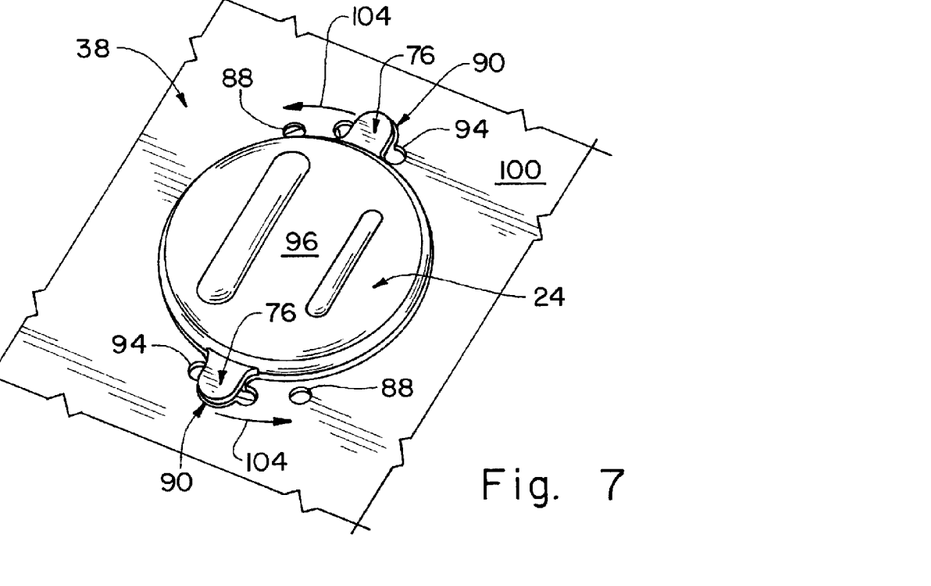
FIG. 7 is a top perspective view of the thermal assembly of FIG. 3 having been inserted in mounting holes of an appliance wall prior to seating the thermal assembly in the mounting holes.

Housing 40 can further include a cover 48 and a support body 50. Cover 48 can be made of a plastic, a nylon, and/or polypropylene, for example, in a suitable manner (i.e., molding or vacuum forming). As shown in FIGS. 3 and 6, cover 48 can include raised sections on its exterior (or, stated another way, recesses on the interior of cover 48) which conform to temperature sensing device 42 and thermal fuse 44, both of which are contained underneath cover 48. Further, cover 48 can include connection features, such as snaps or ears 74 and 76 and mounting walls 70, which connect (i.e., using a snap-fit) thermal assembly 24 with connection features on appliance (i.e., holes 86, 88, 90 formed in sheet metal). This snap-fit arrangement is discussed in more detail below. Cover 48 can be welded (i.e., ultrasonic welding) to support body 50. Alternatively, thermal assembly 24 can be formed by encapsulating temperature sensing device 42 and thermal fuse 44 using overmolding or injection molding techniques. Alternatively, thermal assembly 24 can be formed by potting temperature sensing device 42 and thermal fuse 44 relative to a housing supporting sensor 42 and fuse 44.

Support body 50 can be made from the same material as cover 48. Support body 50 can include a disk portion 52, a raised platform portion 54, and clamp portions 56. As such, support body 50 can carry electrical terminals 58, which are coupled with and thereby matingly received by terminals (not shown) of appliance 22. More specifically, electrical terminals 58 can protrude through disk 52 and be clamped between platform 54 and clamp portions 56. FIG. 6 shows that support body 50 carries four terminals 58, each terminal 58 corresponding respectively to longitudinal ends of temperature sensing device 42 and thermal fuse 44. Proceeding from the longitudinal ends of sensor 44 and the longitudinal ends of fuse 42 are conductors 60 (which can be referred to as leads 60) for conducting electricity respectively to and from electrical terminals 58. Each conductor 60, thus, projects downward from a respective longitudinal end of sensor 42 and fuse 44 and is joined with a terminal 58 positioned proximate the respective longitudinal end, as shown in FIG. 6. The leads 60 can be welded to the terminals 58, such as by resistance welding or ultrasonic welding. Sensor 42 and fuse 44 can be arranged so as to be electrically in parallel with each other, electrically in series with each other, or electrically separate from one another. In the embodiment of the present invention shown in the drawings, temperature sensing device 42 is a thermistor. Alternatively, temperature sensing device 44 can be a thermostat, a thermocouple, or a resistance temperature detector. Sensor 42 can send control signals corresponding to temperature to a controller (not shown) located on appliance 22 (alternatively, if sensor 42 is a thermostat, thermostat can itself be a controller); that controller can function to turn heater 30 "on" or "off" depending upon the sensed temperature and the desired temperature. Fuse 44 can be in direct electrical connection with heater 30 such that when fuse 44 blows due to excessive temperature, electrical supply to heater 30 is cut off and heater 30 shuts down. Alternatively, fuse 44 can be coupled with the controller of appliance 22 such that a blown fuse 44 causes the controller to cause heater 30 to shut down.

Platform 54 can be higher than disk 52 and include two seats, one seat for seating temperature sensing device 42 and the other seat for seating thermal fuse 44, as shown in FIG. 6. In seating sensor 42 and fuse 44 on platform 54, sensor 42 and fuse 44 are mounted to platform 54 in close proximity relative to one another such that thermal fuse 44 accurately detects heat about temperature sensing device 42. In being in close proximity to each other, sensor 42 and fuse 44 can accurately detect, at least approximately, the same degree of heat within or exiting rotating drum 32. Stated another way, if sensor 44 detects hot air exhaust being 150° F. (for example), fuse 44 is positioned close enough to sensor 42 such that fuse 44 also detects the hot air exhaust as being 150° F., or at least very close to 150° F.

Noted is that both cover 48 and platform 54 of support body 50 can include through holes (not shown). More specifically, the through hole in cover 48 can run generally vertically and be positioned between (centered or offset) the raised portions corresponding to sensor 42 and fuse 44. Similarly, the through hole in platform 54 can run vertically and be positioned on the horizontal landing between (centered or offset) the raised portions of platform 54 serving as seats for sensor 42 and fuse 44. The through holes in cover 48 and platform 54 can serve as material removal and can be used during manufacturing.

In the embodiment of the present invention shown in the drawings, support body 50 can be welded to cover 48 (such as by ultrasonic welding). In attaching cover 48 to support body 50, the recesses formed in the interior of cover 48 lie respectively over temperature sensing device 42 and thermal fuse 44 and thereby capture sensor 42 and fuse 44 between platform 54 and cover 48. In so doing, sensor 42 and fuse 44 are located within housing 40, and, further, sensor 42 and fuse 44 are mounted on platform 54 under cover 48.

Thermal assembly 24 is attached to appliance 22 in a place where sensor 42 and fuse 44 detect the heat within or exiting rotating drum 32, the air within or flowing into the rotating drum 32 having been heated by heater 30. For example, thermal assembly 24 can be placed in hot air exhaust outlet manifold 34 of a clothes dryer 22 (as indicated in FIG. 1), the exhaust outlet manifold 34 proceeding from rotating drum 32. Further, if appliance is a clothes dryer 22, dryer 22 can be either an electric dryer or a gas dryer.

Figure 4:
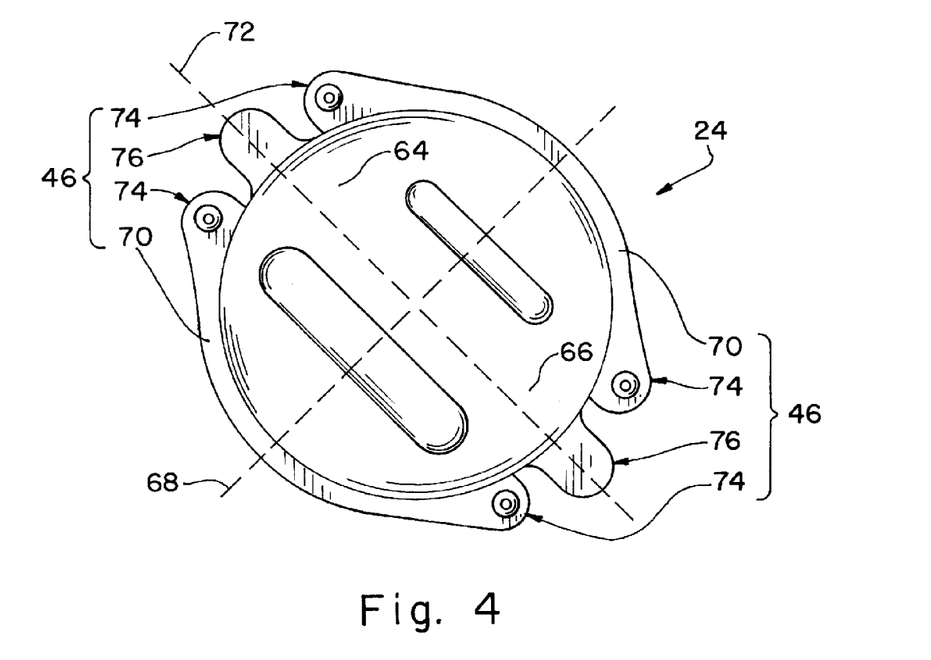
FIG. 4 is a top plan view of the thermal assembly of FIG. 3.
Figure 5:
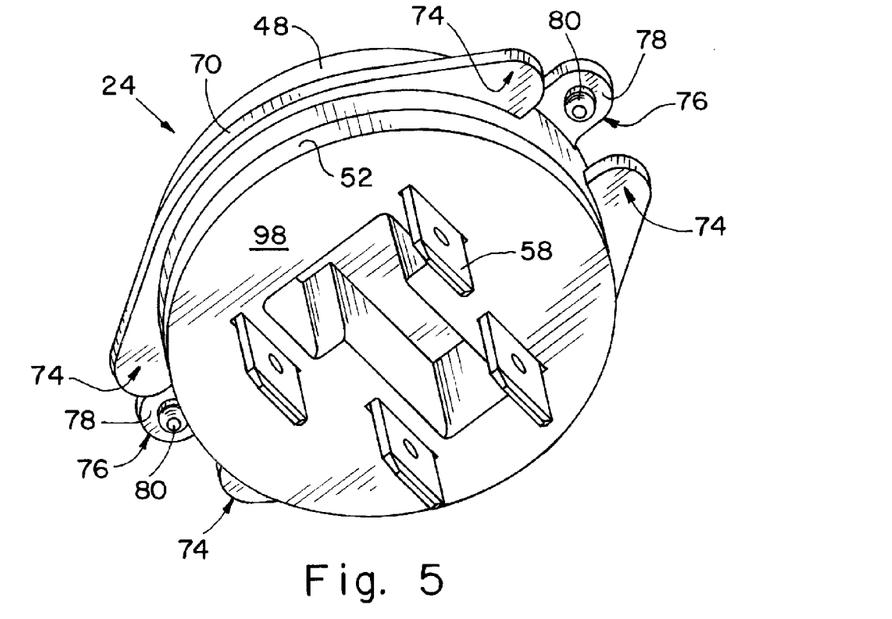
FIG. 5 is a bottom perspective view of the thermal assembly of FIG. 3.

More detail is now provided as to features that can serve to mechanically connect thermal assembly 24 to wall 38 of appliance 22. Cover 48 of housing 40 includes a peripheral edge 62 and defines a first section 64 and a second section 66 opposite first section 64. First section is formed on cover 48 to one side of axis 68, while second section 66 is formed on the other side of axis 68 (FIG. 4). On peripheral edge 62 of cover 48 is formed snap-fit arrangement 46 for snap-fitting thermal assembly 24 to appliance wall 38.

Snap-fit arrangement 46 includes two mounting walls 70 extending laterally from peripheral edge 62, mounting walls 70 mirroring each other with respect to axes 68 and 72. Mounting walls 70 are formed on opposite sides of cover 48 with respect to axis 72. Each mounting wall 70 runs from first section 64 to second section 66 along peripheral edge 62 and runs generally parallel to peripheral edge 62 except at the longitudinal ends of each mounting wall 70. As indicated below, mounting walls 70 serve not only to form ears 74 but also serve together as a stop and a reinforcing mechanism when mounting thermal assembly 24 to appliance wall 38. As already indicated, snap-fit arrangement 46 further includes ears 74 and ears 76, ears 74, 76 snap-fittingly engaging holes 88 and 90 defined in appliance wall 38. Each ear 74 and 76 includes a platform 78 and a nodule 80 (which can also be called a projection 80) mounted on each ear platform 78. Ears 74 in first section 64 are at least substantially identical to ears 74 in second section 66, and ear 76 in first section 64 is at least substantially identical to ear 76 in second section 66. The use of the phrase "substantially identical" is intended to account for manufacturing tolerances. Thus a description of ears 74 and 76 in first section 64 serves to describe ears 74 and 76 in second section 66.

Ears 74, 76 extend laterally from peripheral edge 62. More specifically, ears 74 are formed on each longitudinal end of each mounting wall 70. Stated another way, longitudinal ends of mounting walls 70 generally form tear-drop shaped platforms 78 which, in part, form ears 74. Ears 76 are not mounted on mounting walls 70. Rather, ears 76 stand alone and project from peripheral edge 62 of cover 48 as a tab. In first section 64, ear 76 is centered between two ears 74. Similarly, in second section 66, ear 76 is also centered between two ears 74. Stated another way, as shown in FIG. 4, ear 76 in first section 64 occupies what can be described as the 12 o'clock position on peripheral edge 62 of cover 48, while ear 76 in second section 66 occupies the 6 o'clock position on peripheral edge 62. The two ears 74 in first section 64 occupy respectively approximately the 11 o'clock and 1 o'clock positions on peripheral edge 62, while the two ears 74 in second section 66 occupy respectively approximately the 5 o'clock and 7 o'clock positions on peripheral edge 62. Thus, first section 64 includes two ears 74 and one ear 76 therebetween, and second section 66 includes two ears 74 and one ear 76 therebetween.

Figure 11:
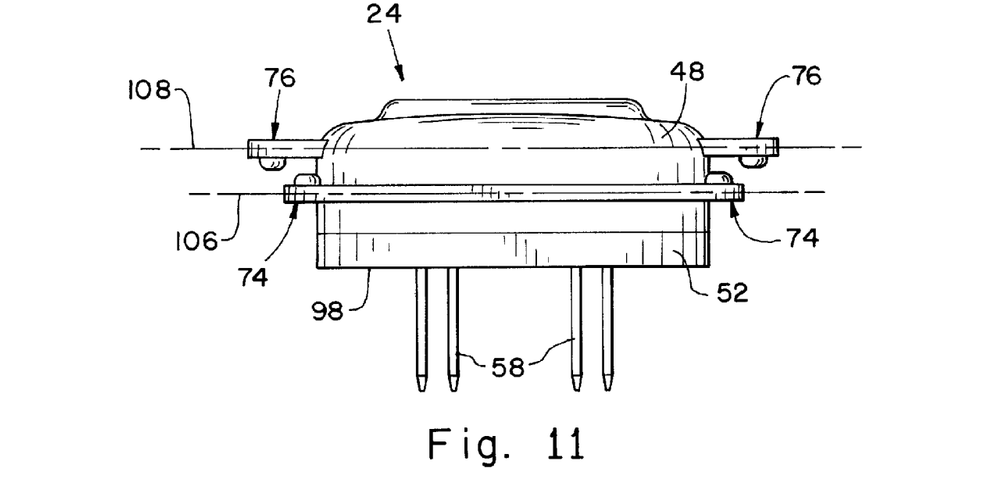
FIG. 11 is a side view of the thermal assembly of FIG. 3.

Each ear 74 is horizontally and vertically offset from each ear 76 (Note, what is meant by vertical, horizontal, top, and bottom herein in reference to thermal assembly 24 is intended to have reference to an imaginary horizontal plane on which terminals 58 are positioned, terminals 58 serving as legs for the remaining portions of terminal assembly 24; in use, however, thermal assembly 24 may be rotated and no longer be so positioned on a horizontal plane.). Stated another way, ears 74 are horizontally and vertically spaced from ear 76 in first section 64. This is also the case in second section 66. This horizontal and vertical spacing is readily shown in FIGS. 4 and 11. Further, and more specifically, all ears 74 lie in a first plane 106, all ears 76 lie in a second plane 108, and planes 106 and 108 are offset from each other. Assuming terminals 58 stand thermal assembly 24 on the aforementioned horizontal plane, then planes 106 and 108 are both at least substantially horizontal and thus vertically offset from one another and at least substantially parallel to one another. Plane 106 runs through the horizontal midline of the material thickness of mounting walls 70 and platforms 78 of ears 74 (mounting walls 70 and platforms 78 of ears 74 being coplanar), and (like ears 74) plane 108 runs through the horizontal midline of the material thickness of platforms 78 of ears 76. The offset of planes 106 and 108 is thus made with specific reference to platforms 78 of ears 74 and 76; that is, platforms 78 of ears 74 are offset from platforms 78 of ears 76, as shown in FIGS. 5-8 and 11. On the other hand, nodules 80 may or may not be offset from each other; that is, a plane running through a midline of nodules 80 of ears 74 may or may not be coplanar with a plane running through a midline of nodules 80 of ears 76. FIG. 11 shows nodules 80 of ears 74 being offset (not aligned) with nodules 80 of ears 76; nodules 80 of ears 74 and ears 76 could be larger and then be aligned. The offset between planes 106 and 108 accommodates the appliance wall 38 between ear platforms 78 of ears 74 and 76. FIG. 11 shows planes 106 and 108 as broken lines, it being understood that planes 106 and 108 run perpendicular to the page of the drawing.

Nodules 80 (or, projections 80) on ears 74 face in the same direction 82 relative to each other. Nodules 80 on ears 76 face in the same direction 84 relative to each other. However, nodules 80 of ears 74 face in the opposite direction relative to nodules 80 of ears 76. Stated another way, direction 82 is opposite direction 84.

Figure 10:
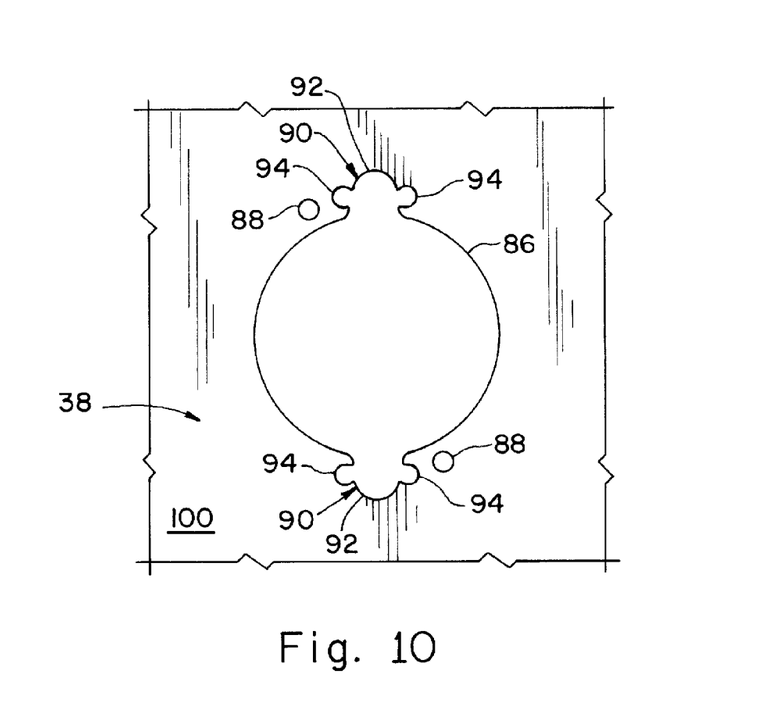
FIG. 10 is bottom plan view of the appliance wall of FIGS. 7-9.

Appliance wall 38, as shown in FIGS. 7-10, defines a plurality of holes 86, 88, 90 for accommodating thermal assembly 24 in snap-fit engagement. These appliance wall holes include a large hole 86 and two smaller holes 88. Hole 86 is a relatively large hole which matingly accommodates peripheral edge 62 of cover 48. When inserting thermal assembly 24 in hole 86, mounting walls 70 stop thermal assembly 24 from traveling all of the way through hole 86 and thus lie adjacent appliance wall 38. But for mounting holes 90 being in communication with hole 86 as shown in FIG. 10, hole 86 is generally circular in shape. At generally the 12 o'clock and 6 o'clock positions of hole 86 are formed mounting holes 90. Mounting holes 90 can be in communication with mounting hole 86 (that is, hole 86 and holes 90 essentially form one large hole together), as shown in FIG. 10; alternatively, mounting holes 90 can be formed so as not to be in communication with hole 86. Mounting holes 88 are not in communication with mounting holes 86 or 90, are located to one side of each mounting hole 90, and are 180 degrees apart from each other (stated another way, diametrically apart), as shown in FIGS. 7-10 (in particular, FIG. 10). Mounting holes 88 can be substantially circular and are shaped to matingly accommodate nodules 80 of ears 74 disposed in first and second sections 64, 66 of cover 48. Each mounting hole 90 is at least substantially identical to each other. Each mounting hole 90 includes three branches 94, 92, and 94. The three branches are a larger center branch 92 and two, at least substantially identical, smaller side branches 94 positioned to either side of center branch 92. Center branch 92 is shaped and sized to matingly accommodate the insertion of ear platform 78 of each ear 76 when thermal assembly 24 is inserted in hole 86. Each side branch 94 is shaped and sized to matingly accommodate seating of a nodule 80. More specifically, one side branch 94 matingly accommodates the nodule 80 of ear 76, while the other side branch 94 matingly accommodates nodule 80 of one of the ears 74 (that is, the ear 74 which is not seated in mounting hole 88). As such, each projection 80 of ears 74, 76 engages a corresponding hole 86, 88, or 90.

In use, thermal assembly 24 can be attached to appliance 22 using the aforedescribed snap-fit arrangement 46, which can include resilient ears 74, 76 of cover 80. Upon mechanically securing thermal assembly 24 to appliance 22, electrical terminals 58 can be electrically coupled with corresponding features (not shown) of appliance 22 (i.e., an appliance electrical connector which is moved to terminals 58 to mate therewith). During normal operation (without malfunctions of temperature sensing device 42), temperature sensing device 42, alone (i.e., a thermostat) or in combination with a controller of appliance 22, regulates the amount of heat produced by heater 30. If, for instance, temperature sensing device 42 malfunctions and fails to turn off heater 30, heater 30 continues to produce heat unless an extra safety measure is employed. Thermal fuse 44 provides that extra safety measure. As such, when sensor 42 fails, fuse 44 also detects heat produced by heater 30 and can cut off electrical supply to heater 30 before the temperature produced by heater 30 reaches a dangerous level. If fuse 44 blows, then thermal assembly 24, being a modular assembly, is replaced as a single unit.

Figure 8:
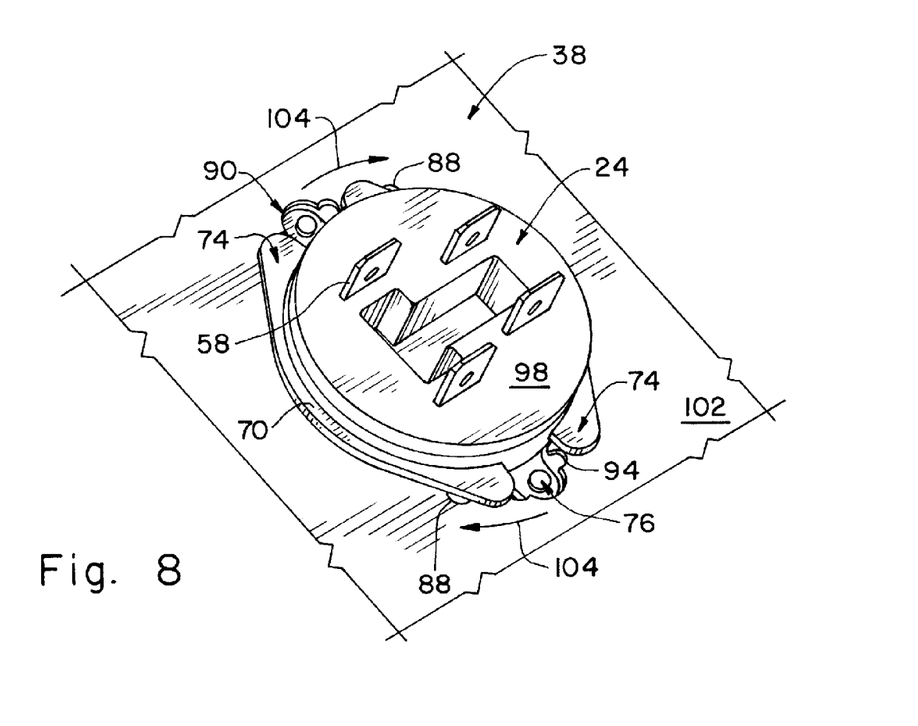
FIG. 8 is a bottom perspective view of the thermal assembly of FIG. 3 having been inserted in mounting holes of the appliance wall prior to seating the thermal assembly in the mounting holes.
Figure 9:
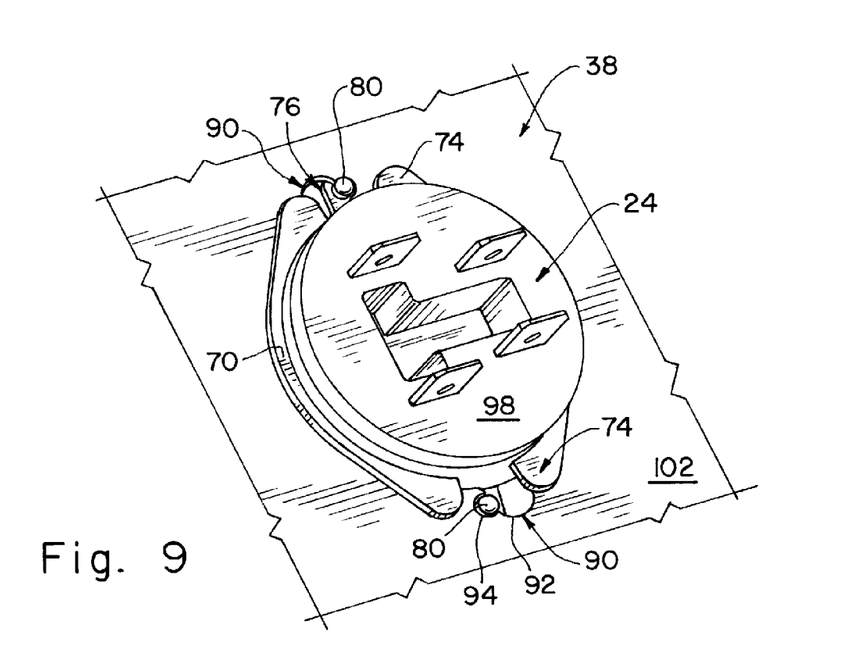
FIG. 9 is a top plan view of the thermal assembly of FIG. 3 seated in mounting holes of the appliance wall.

More specifically as to the mechanical connection between thermal assembly 24 and appliance 22, the installer can grasp electrical terminals 58, for instance. Installer can then insert the top side 96 of thermal assembly 24 into mounting hole 86. As such, top side 96 can be directed towards the interior of hot air exhaust outlet 34 so that sensor 42 and fuse 44 are immersed in the hot air; that is, top side 96 of thermal assembly 24 is disposed adjacent interior side 100 of appliance wall 38, and bottom side 98 of thermal assembly 24 is disposed proximate the exterior side 102 of appliance wall 38. When inserting top side 96 through hole 86, ears 76 eventually insert through, or at least partially through, corresponding center branches 92 of holes 90; meanwhile, nodules 80 of ears 74 can face exterior side 102 of appliance wall 38. Thermal assembly 24 can be inserted through holes 86 and 90 until mounting walls 70 abut exterior side 102 of appliance wall 38. At this point, thermal assembly 24 will proceed no farther through holes 86 and 90. Installer then rotates thermal assembly 24 in direction 104 on a plane which is at least substantially level with appliance wall 38 (stated another way, the rotation occurs about an axis running through the center of thermal assembly 24 and running perpendicular to a plane formed by appliance wall 38). Even if wall 38 is not completely planar, wall 38 can be at least generally planar (which allows for some curvature in wall 38). The thermal assembly is rotated until nodules 80 of ears 74 and 76 seat in their corresponding holes 88 and 90. More specifically, as shown in FIG. 8, thermal assembly 24 is rotated clockwise until nodules 80 of ears 74 at the 1 o'clock and 7 o'clock positions seat in corresponding holes 88. While these nodules 80 of ears 74 so seat, the nodules 80 of the other ear 74 will seat in the side branch 94 of hole 90 farthest away from the corresponding hole 88 and the nodules 80 of ear 76 will seat in the side branch 94 of hole 90 nearest the corresponding hole 88. Thus, in snap-fitting thermal assembly 24 to appliance wall 38, ears 74, 76 and mounting walls 70 serve to clamp thermal assembly to appliance wall 38. To uninstall thermal assembly 24 from appliance wall 38, thermal assembly 24 is turned in the opposite direction and then pulled out of hole 86 in the opposite direction in which thermal assembly was originally inserted.

The present invention further provides a method of monitoring heat produced by heater 30 of appliance 22. The method includes the steps of providing, attaching, electrically coupling, cutting off, and detaching. The providing step provides thermal assembly 24 including housing 40, temperature sensing device 42 carried by housing 40, and thermal fuse 44 carried by housing 40. The attaching step attaches thermal assembly 24, as a single unit, to appliance 22. The electrically coupling step electrically couples temperature sensing device 42 and thermal fuse 44 with appliance 22. The cutting off step cuts off the heat produced by heater 30 using thermal assembly 24. The detaching step detaches thermal assembly 24, as said single unit, from appliance 22, thermal assembly 24 being a modular assembly. The method can further include the step of providing electrical terminals 58 carried by housing 40, electrical terminals 58 coupled with appliance 22. Temperature sensing device 42 can be a thermistor, a thermostat, or a thermocouple. Temperature sensing device 42 and thermal fuse 44 can be mounted to housing 40 in close proximity relative to one another such that thermal fuse 44 detects heat about temperature sensing device 42. Temperature sensing device 42 and thermal fuse 44 can be located within housing 40. Housing 40 includes cover 48 and platform 54, temperature sensing device 42 and thermal fuse 44 being mounted on platform 54 under cover 48.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An appliance assembly, comprising:
an appliance; and
a thermal assembly including:
a housing attached to said appliance, said housing including a cover, a base with a side, and a platform, said cover and said platform being mounted on only said side of said base, said platform being mounted on said side under said cover;
a temperature sensing device carried by said housing and electrically coupled with said appliance; and
a thermal fuse carried by said housing and electrically coupled with said appliance, said temperature sensing device and said thermal fuse being mounted on said platform under said cover, said thermal assembly being a modular assembly and thereby configured for being, as a single unit, attached to and detached from said appliance.

2. The appliance assembly of claim 1, wherein said thermal assembly includes a plurality of electrical terminals carried by said housing, said plurality of electrical terminals coupled with said appliance.

3. The appliance assembly of claim 1, wherein said temperature sensing device is one of a thermistor, a thermostat, and a thermocouple.

4. The appliance assembly of claim 1, wherein said appliance includes a heater, said temperature sensing device and said thermal fuse being mounted to said housing in close proximity relative to one another such that said thermal fuse detects heat about said temperature sensing device.

5. The appliance assembly of claim 4, wherein said temperature sensing device and said thermal fuse are located within said housing.

6. The appliance assembly of claim 1, wherein said appliance is a laundry dryer.

7. The appliance assembly of claim 1, wherein said thermal assembly includes a plurality of plug electrical terminals electrically connected to said temperature sensing device and said thermal fuse and carried by said housing, said plurality of plug electrical terminals being configured for being attached to and detached from said appliance.

8. A thermal assembly, comprising:
a housing configured for coupling with an appliance, said housing including a cover, a base with a side, and a platform, said cover and said platform being mounted on only said side of said base, said platform being mounted on said side under said cover;
a temperature sensing device carried by said housing and configured for electrically coupling with said appliance; and
a thermal fuse carried by said housing and configured for electrically coupling with said appliance, said temperature sensing device and said thermal fuse being mounted on said platform under said cover, the thermal assembly being a modular assembly and thereby configured for being, as a single unit, attached to and detached from said appliance.

9. The thermal assembly of claim 8, further including a plurality of electrical terminals carried by said housing, said plurality of electrical terminals configured for coupling with said appliance.

10. The thermal assembly of claim 8, wherein said temperature sensing device is one of a thermistor, a thermostat, and a thermocouple.

11. The thermal assembly of claim 8, wherein said temperature sensing device and said thermal fuse are mounted to said housing in close proximity relative to one another such that said thermal fuse detects heat about said temperature sensing device.

12. The thermal assembly of claim 11, wherein said temperature sensing device and said thermal fuse are located within said housing.

13. A method of monitoring heat produced by a heater of an appliance, said method comprising the steps of:
providing a thermal assembly including a housing, a temperature sensing device carried by said housing, and a thermal fuse carried by said housing, said housing including a cover, a base with a side, and a platform, said cover and said platform being mounted on only said side of said base, said platform being mounted on said side under said cover, said temperature sensing device and said thermal fuse being mounted on said platform under said cover;
attaching said thermal assembly, as a single unit, to the appliance;
electrically coupling said temperature sensing device and said thermal fuse with the appliance;
cutting off the heat produced by the heater using said thermal assembly; and
detaching said thermal assembly, as said single unit, from the appliance, said thermal assembly being a modular assembly.

14. The method of claim 13, further including the step of providing a plurality of electrical terminals carried by said housing, said plurality of electrical terminals coupled with the appliance.

15. The method of claim 13, wherein said temperature sensing device is one of a thermistor, a thermostat, and a thermocouple.

16. The method of claim 13, wherein said temperature sensing device and said thermal fuse are mounted to said housing in close proximity relative to one another such that said thermal fuse detects heat about said temperature sensing device.

17. The method of claim 16, wherein said temperature sensing device and said thermal fuse are located within said housing.

* * * * *